Patented May 24, 1949

2,471,267

UNITED STATES PATENT OFFICE 2,471,267

VINYL POLYMERS PLASTICIZED WITH SULFUR TREATED EXTRACTS OF MINERAL OIL FRACTIONS

Eric William Musther Fawcett, Eric Sylvester Narracott, and Albert Millien, Sunbury-on-Thames, England, assignors to Anglo-Iranian Oil Company Limited, London, England, a British joint-stock corporation No Drawing. Application December 30, 1944, Serial No. 570,790. In Great Britain January 6, 1944

6 Claims. (Cl. 260—30.8)

This invention relates to the production of plastic compositions from a polyvinyl halide such as polyvinyl chloride or polyvinyl halide co-polymers such as the co-polymers of vinyl chloride with vinyl acetate, methyl acrylate, vinylidene chloride or the like, adapted for use for example as coating compositions, cable dielectric compounds, and moulding compositions.

The use of substances of the character of tricresyl phosphate, dibutyl phthalate, and dibenzyl sebacate as plasticisers for polyvinyl chloride or its co-polymers has long been practised. They are polar in character, and are thus known to have an adverse effect on the electrical and water resistant properties of the polymers. Their other physical properties such for example as tensile strength are also known to depreciate rapidly with increasing additions of the plasticisers to these polymers.

In the specification filed pursuant to the co-pending application Serial No. 513,468, filed December 8, 1943, a process is described for producing such compositions in the use as plasticisers or partial plasticisers and/or fillers consisting of certain hydrocarbons obtained from mineral oil fractions by extraction with selective solvents of a polar character. These hydrocarbons are of molecular weight preferably within the range 250–750 and their initial and final boiling points are preferably within the range 250–800° C. at 760 mm. Hg pressure. The hydrocarbons are characterised by a high carbon content (at least .6 atom of carbon per atom of hydrogen), are generally unsaturated and may contain up to two unsaturated linkages per molecule. The hydrocarbons may also contain an adventitious minor proportion of sulphur and/or nitrogen in combined form.

These high colecular weight hydrocarbons have good electrical and water resistant properties because of their non-polar character and are compatible with a polyvinyl halide such as polyvinyl chloride and many polyvinyl halide co-polymers such as the co-polymers of vinyl chloride with vinyl acetate, methyl acrylate, vinylidene chloride or the like, and act as plasticisers, partial plasticisers and/or fillers in such polymer compositions as are used for moulded and other goods particularly where a highly plasticised and extensible structure is not desired.

In a co-pending application Serial No. 569,418, filed December 22, 1944, there is described a treatment of the extracts that results in improved low temperature resistance of the finished compositions.

We have now discovered that when similar extracts are sulphur treated according to the manner hereinafter described the sulphur treated extract hydrocarbons show some increase in compatibility with polyvinyl chloride, while the finished plasticised polyvinyl chloride or polyvinyl chloride co-polymer compositions show marked improvement in electrical properties over the corresponding products in which untreated extract hydrocarbons are used as plasticisers, partial plasticisers and/or fillers.

According to the present invention therefore a mineral oil fraction which term is intended to include mineral oil residues having the characteristics hereinbefore described is first extracted with a selective polar solvent which term is intended to include a mixture of selective solvents one at least of which is of a polar character. The desired hydrocarbons are to be found in the extract phase and are recovered by the removal of the solvent advantageously by distillation. The extract hydrocarbons thus obtained and preferably after first being refined, are treated at a moderately elevated temperature for extended periods of time of from about 5 hours up to 60 hours with a determined proportion of sulphur not generally exceeding 15% of their weight of sulphur. The hydrocarbon product may be incorporated with polyvinyl chloride or co-polymer compositions as a filler, or as a filler and plasticiser either alone or with known plasticisers.

The solvent extraction step may be carried out in known manner. We have found that a mixture of sulphur dioxide and benzene gives successful results, but a wide range of other known solvents may advantageously be used, as for example, sulphur dioxide, alcohols, furfural or phenols.

The sulphur treatment may be carried out at temperatures within the range 150–300° C. and preferably within the range 190–230° C. and may be carried out under superatmospheric pressure, but in general it is advantageous to operate at atmospheric pressure. The amount of sulphur used may vary within fairly wide limits as for example from about 5% by weight up to 15% by weight of the extract hydrocarbons.

The material may be processed in known manner, for example, by distillation, partial absorption on porous earths or like materials, precipitation with solvents, etc., with the object of rendering the material lighter in colour before incorporation into compositions as hereinbefore described.

The following Example 1 indicates conditions for the preparation of the sulphur treated extract hydrocarbons, while the following Examples 2 and 3 indicate the improved electrical properties of polyvinyl chloride compositions containing a sulphur-treated extract instead of untreated extract.

*Example 1.*—A mineral oil fraction boiling in the approximate range 435–485° C. at 760 mm. Hg pressure was submitted to multiple-stage, counter-current extraction with a mixture of sulphur dioxide and benzene in the ratio of 85 parts by volume of sulphur dioxide to 15 parts by volume of benzene, employing a total proportion of the mixture amounting to 200% by volume of the mineral oil fraction, and employing a temperature gradient during extraction of 140 to 25° F. The extract hydrocarbons after evaporation of benzol and sulphur dioxide amounted to 30% by weight of the original mineral oil fraction and had a specific gravity at 60° F. of 1.013. The material prepared in the manner described was according to the invention heated for 48 hours at 190° C. with 5% of its weight of sulphur added in a finely divided state and the product had a specific gravity of 1.038.

*Example 2.*—This example indicates the improvement in electrical properties resulting from the use of sulphur treated extract hydrocarbons rather than the untreated material.

45 parts by weight of sulphur-treated extract hydrocarbons prepared according to Example 1 were mixed for 20 minutes at 120° C. in an internal mixer with 100 parts by weight of polyvinyl chloride, 45 parts by weight of dibutyl phthalate and 4 parts by weight of lead silicate. The mixture was then transferred to an open roll mill and milled for 20 minutes at 140° C. The sheet of plasticised material thus obtained was moulded under pressure at 150° C. to 0.05 inch thickness. The improved electrical properties obtained are indicated in the following table, which includes the properties obtained in the use of untreated instead of the sulphur-treated extract hydrocarbons.

| Determinations | Untreated extract hydrocarbons | Sulphur-treated extract hydrocarbons |
| --- | --- | --- |
| Tensile Strength, lb./sq. in | 1,570 | 1,960 |
| Elongation at Break, per cent | 360 | 400 |
| Shore Hardness | 55 | 57 |
| Low-temperature Flexibility limit, °C | −30 | −30 |
| Volume Resistivity, ohm-cm | 1.2×10$^{12}$ | 3.0×10$^{12}$ |

*Example 3.*—This example further indicates the improvement in electrical properties which are obtained by using the sulphur-treated extract hydrocarbons in place of the material not so treated.

25 parts by weight of the sulphur-treated extract hydrocarbons prepared according to Example 1, were mixed with 100 parts by weight of polyvinyl chloride, 25 parts by weight of dibutyl phthalate, 4 parts by weight of lead silicate and 2 parts by weight of ethyl palmitate in an internal mixer for 20 minutes at 120° C., after which the mixture was transferred to a roll mill and milled for 20 minutes at 140° C. The sheet of plasticised material thus obtained was moulded under pressure at 150° C. to 0.05 thickness.

The determined properties of the sulphur-treated extract hydrocarbons are indicated in the following table in comparison with those of a product in the use of untreated extract hydrocarbons.

| Determinations | Untreated extract hydrocarbons | Sulphur-treated extract hydrocarbons |
| --- | --- | --- |
| Tensile Strength, lbs./sq. in | 2,820 | 3,180 |
| Elongation at Break, per cent | 260 | 260 |
| Shore Hardness | 83 | 81 |
| Low temperature flexibility limit, °C | −25 | −25 |
| Volume resistivity, ohm-cm | 1.1×10$^{14}$ | 4.3×10$^{14}$ |
| Specific inductive capacity: | | |
| 50 c. p. s | 4.39 | 4.28 |
| 800 c. p. s | 3.50 | 3.46 |
| Loss factor: | | |
| 50 c. p. s | 0.096 | 0.090 |
| 800 c. p. s | 0.080 | 0.072 |

We claim:

1. The composition of matter of improved electrical properties comprising an intimate admixture of a polymeric substance selected from the group consisting of polyvinyl chloride, vinyl chloride-vinyl acetate co-polymer, vinyl chloride-vinylidene chloride co-polymer and vinyl chloride-methyl acrylate co-polymer with a sulphur treated hydrocarbon material prepared by the treatment with sulphur at a moderately elevated temperature within the range 150–300° C. for an extended period of from about 5 hours up to 60 hours of extract hydrocarbons derived from a mineral oil fraction by solvent extraction with a selective polar solvent, the proportion of sulphur being in the range of from about 5% to about 15% of the weight of said extract hydrocarbons, the extract hydrocarbons containing up to two unsaturated linkages per molecule and having a carbon content of on average at least .6 atoms of carbon per atom of hydrogen, the molecular weight of the hydrocarbons being in the range 200–800, and the initial and final boiling points being in the range of 250–800° C. at 760 mm. Hg pressure.

2. The composition of matter as specified in claim 1 in which the molecular weight of the hydrocarbons is in the range 250–750.

3. The composition of matter as specified in claim 1 in which the sulphur treatment is carried out at a temperature within the range 190–230° C.

4. A process for the production of vinyl polymer plastic compositions of improved electrical properties comprising intimately incorporating at an elevated temperature a polymeric substance selected from the group consisting of polyvinyl chloride, vinyl chloride-vinyl acetate co-polymer, vinyl chloride-methyl acrylate co-polymer and vinyl chloride-vinylidene chloride co-polymer with sulphur treated hydrocarbons which have been produced by extracting from mineral oil fractions with a selective solvent, hydrocarbons of molecular weight in the range 200–800, having initial and final boiling points within the range 250–800° C. at 760 mm. of mercury pressure, containing up to two unsaturated linkages per molecule and having a carbon content of on average at least 0.6 atoms of carbon per atom of hydrogen, and by heating the extracted hydrocarbons at a temperature within the range 150–300° C. for a period of from about 5 hours to about 50 hours in admixture with from about 5% to about 15% by weight of sulphur based on the weight of the extracted hydrocarbons.

5. A process for producing plastic compositions as specified in claim 4 in which the sulphur treated hydrocarbons have been produced by heating with sulphur at a temperature within in the range 190–250° C.

6. A process for producing plastic compositions as specified in claim 5 in which the molecular weight of the hydrocarbons is in the range 250–750.

ERIC WILLIAM MUSTHER FAWCETT.
ERIC SYLVESTER NARRACOTT.
ALBERT MILLIEN.

REFERENCES CITED

The following references are of record in the file of this patent:

UNITED STATES PATENTS

| Number | Name | Date |
|---|---|---|
| 2,210,434 | Rosenthal | Aug. 6, 1940 |
| 2,217,918 | Rostler | Oct. 15, 1940 |
| 2,245,500 | Rein | June 10, 1941 |
| 2,399,694 | Rostler | May 7, 1946 |

FOREIGN PATENTS

| Number | Country | Date |
|---|---|---|
| 562,956 | Great Britain | July 24, 1944 |